United States Patent
Kadam et al.

(10) Patent No.: US 6,976,068 B2
(45) Date of Patent: Dec. 13, 2005

(54) METHOD AND APPARATUS TO FACILITATE REMOTE SOFTWARE MANAGEMENT BY APPLYING NETWORK ADDRESS-SORTING RULES ON A HIERARCHICAL DIRECTORY STRUCTURE

(75) Inventors: Sunil S. Kadam, Hillsboro, OR (US); Tianying Fu, Beaverton, OR (US); Satish K. Shetty, Beaverton, OR (US); Michael P. Bacus, Tigard, OR (US)

(73) Assignee: McAfee, Inc., Santa Clara, CA (US)

( * ) Notice: Subject to any disclaimer, the term of this patent is extended or adjusted under 35 U.S.C. 154(b) by 657 days.

(21) Appl. No.: 09/952,755

(22) Filed: Sep. 13, 2001

(65) Prior Publication Data

US 2003/0051020 A1    Mar. 13, 2003

(51) Int. Cl.⁷ .......................................... G06F 15/173
(52) U.S. Cl. .................... 709/223; 709/203; 709/222; 709/220; 709/224
(58) Field of Search ................. 713/201; 709/223, 709/227, 203, 222, 220, 224

(56) References Cited

U.S. PATENT DOCUMENTS

| | | | | |
|---|---|---|---|---|
| 5,875,296 A | | 2/1999 | Shi et al. .............. | 395/188.01 |
| 6,243,815 B1 * | | 6/2001 | Antur et al. ............. | 713/201 |
| 6,332,158 B1 | | 12/2001 | Risley et al. ............ | 709/219 |
| 6,339,423 B1 | | 1/2002 | Sampson et al. .......... | 345/357 |
| 6,408,336 B1 * | | 6/2002 | Schneider et al. ........ | 709/229 |
| 6,681,323 B1 * | | 1/2004 | Fontanesi et al. ......... | 713/1 |
| 6,697,851 B1 * | | 2/2004 | Althaus et al. ............ | 709/220 |
| 2001/0056572 A1 | | 12/2001 | Richard et al. ............ | 717/11 |
| 2002/0124082 A1 * | | 9/2002 | San Andres et al. ....... | 709/225 |
| 2003/0009434 A1 * | | 1/2003 | Munn et al. ............... | 707/1 |

OTHER PUBLICATIONS

"ePolicy Orchestrator Product Guide Version 2.0" McAfee, May 2001.
Copy of Office Action Summary from U.S. Appl. No. 09/971,333 which was mailed on May 26, 2005.

* cited by examiner

Primary Examiner—Frantz B. Jean
Assistant Examiner—Dhairya A. Patel
(74) Attorney, Agent, or Firm—Zilka-Kotab, PC; Christopher J. Hamaty

(57) ABSTRACT

One embodiment of the present invention provides a system to facilitate software management by applying network address-sorting rules on a hierarchical directory structure. The system operates by creating a hierarchical directory structure that reflects the logical coupling among computers within an enterprise. This hierarchical directory structure is sorted based on network addresses of the constituent computers of the enterprise. The system establishes a software policy at the root level of the hierarchical directory structure. Individual computers within the enterprise inherit the software policy from the root level of the hierarchical directory structure.

10 Claims, 4 Drawing Sheets

METHOD AND APPARATUS TO FACILITATE REMOTE SOFTWARE MANAGEMENT BY APPLYING NETWORK ADDRESS-SORTING RULES ON A HIERARCHICAL DIRECTORY STRUCTURE

RELATED APPLICATION

The subject matter of this application is related to the subject matter in a co-pending non-provisional application by Tianying Fu, Sunil S. Kadam, and Michael P. Bacus entitled, "Method and Apparatus to Facilitate Cross-Domain Push Deployment of Software in an Enterprise Environment," having Ser. No. 09/971,333, and filing date Oct. 4, 2001.

BACKGROUND

1. Field of the Invention

The present invention relates to software management. More specifically, the present invention relates to a method and an apparatus to facilitate remote software management by applying address-sorting rules on a hierarchical directory structure.

2. Related Art

Software management presents many challenges to an administrator of an enterprise system. This software management can encompass many aspects of configuring and maintaining the enterprise system, such as software distribution, configuration management, software management, and policy management, such as enforcing rules for virus scanners.

In smaller enterprise systems, it is feasible for an administrator to visit each computer within the enterprise to create the necessary configurations. However, as the enterprise grows or spreads to multiple locations, it quickly becomes impractical for the administrator to visit each computer.

Administrators, therefore, have developed methods to remotely configure the computers within an enterprise system. These methods, while advantageous, present their own set of problems. Managing a computer system from a central location can create a bottleneck when possibly hundreds of computers are trying to update their configuration simultaneously. This can be exacerbated by slow links between the central location and remotely located groups of computers.

Managing multiple configurations across an enterprise system also presents problems for the administrator. For example, a sales department may need a different configuration than a product development department, or parts of the enterprise in different locations may need different configurations. At times a configuration may apply to an entire group of computers, while at other times a configuration may apply to only a single computer. Remembering which group that a particular computer belongs to, or remembering if that particular computer requires a special configuration, is a formidable and error-prone task.

What is needed is a method and an apparatus to remotely manage software on computers within an enterprise without the disadvantages presented above.

SUMMARY

One embodiment of the present invention provides a system to facilitate software management by applying address-sorting rules on a hierarchical directory structure. The system operates by creating a hierarchical directory structure that reflects the logical coupling among computers within an enterprise. This hierarchical directory structure is sorted based on network addresses of the constituent computers of the enterprise. Next, the system establishes a software policy at the root level of the hierarchical directory structure. Individual computers within the enterprise subsequently inherit the software policy from the root level of the hierarchical directory structure.

In one embodiment of the present invention, the system stores the hierarchical directory structure in a database coupled to a server.

In one embodiment of the present invention, the system applies a sub-net mask to the addresses before sorting the hierarchical directory structure.

In one embodiment of the present invention, the system establishes a modifier for the root software policy at subordinate levels of the hierarchical directory structure.

In one embodiment of the present invention, the system inherits the root software policy including any modifiers for the software policy.

In one embodiment of the present invention, the system compiles the software policy by applying modifiers to the software policy to produce a modified software policy for the computer.

In one embodiment of the present invention, the system manages software on the computer using the modified software policy.

In one embodiment of the present invention, managing software on the computer includes managing virus scan policies associated with the computer.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer Systems

Figure 1:
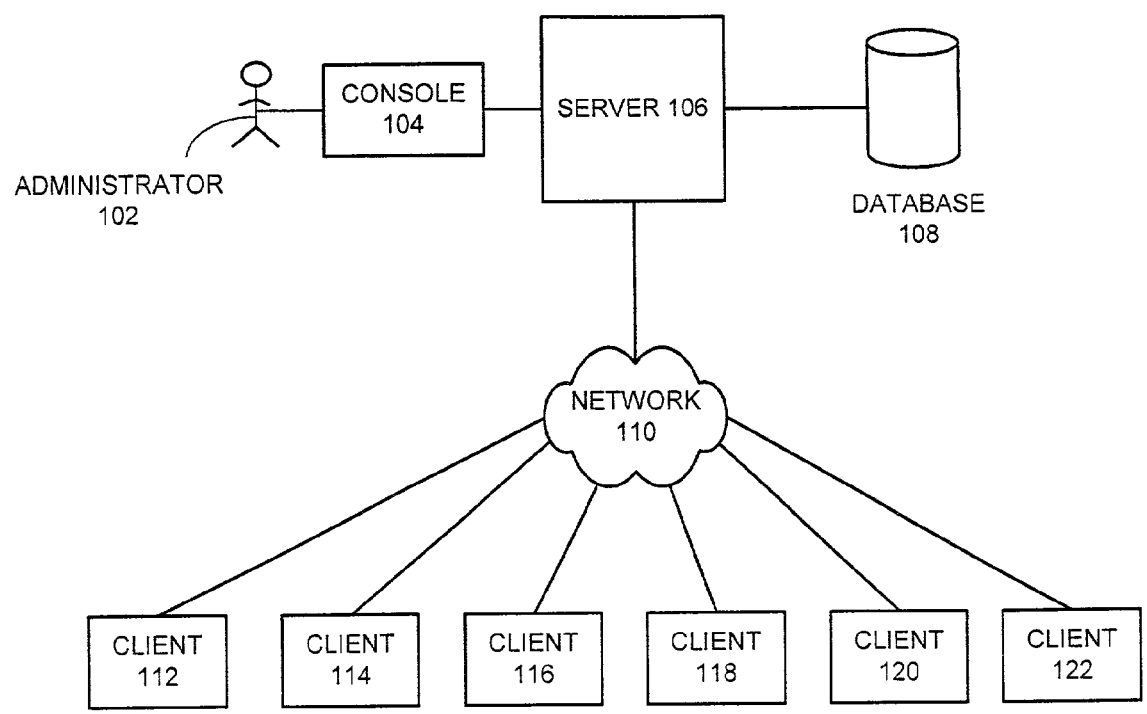
FIG. 1 illustrates computer systems coupled together in accordance with an embodiment of the present invention.

FIG. 1 illustrates computer systems coupled together in accordance with an embodiment of the present invention. The system includes console 104, server 106, and clients 112, 114, 116, 118, 120, and 122. Console 104, server 106, and clients 112, 114, 116, 118, 120, and 122 can generally include any type of computer system, including, but not limited to, a computer system based on a microprocessor, a mainframe computer, a digital signal processor, a portable computing device, a personal organizer, a device controller, and a computational engine within an appliance.

Server 106, and clients 112, 114, 116, 118, 120, and 122 are coupled together by network 110. Network 110 can generally include any type of wire or wireless communication channel capable of coupling together computing nodes. This includes, but is not limited to, a local area network, a wide area network, or a combination of networks. In one embodiment of the present invention, network 110 includes the Internet.

Server 106 is coupled to database 108 for storing and maintaining a hierarchical directory structure and related files as described below. Database 108 can include any type of system for storing data in non-volatile storage. This includes, but is not limited to, systems based upon magnetic, optical, and magneto-optical storage devices, as well as storage devices based on flash memory and/or battery-backed up memory.

Administrator 102 accesses server 106 using console 104 to establish the hierarchical directory structure and establish software management policies for clients 112, 114, 116, 118, 120, and 122. Note that clients 112, 114, 116, 118, 120, and 122 serve as examples herein, and that the system may have as many clients as desired.

Hierarchical Directory Structure

Figure 2:
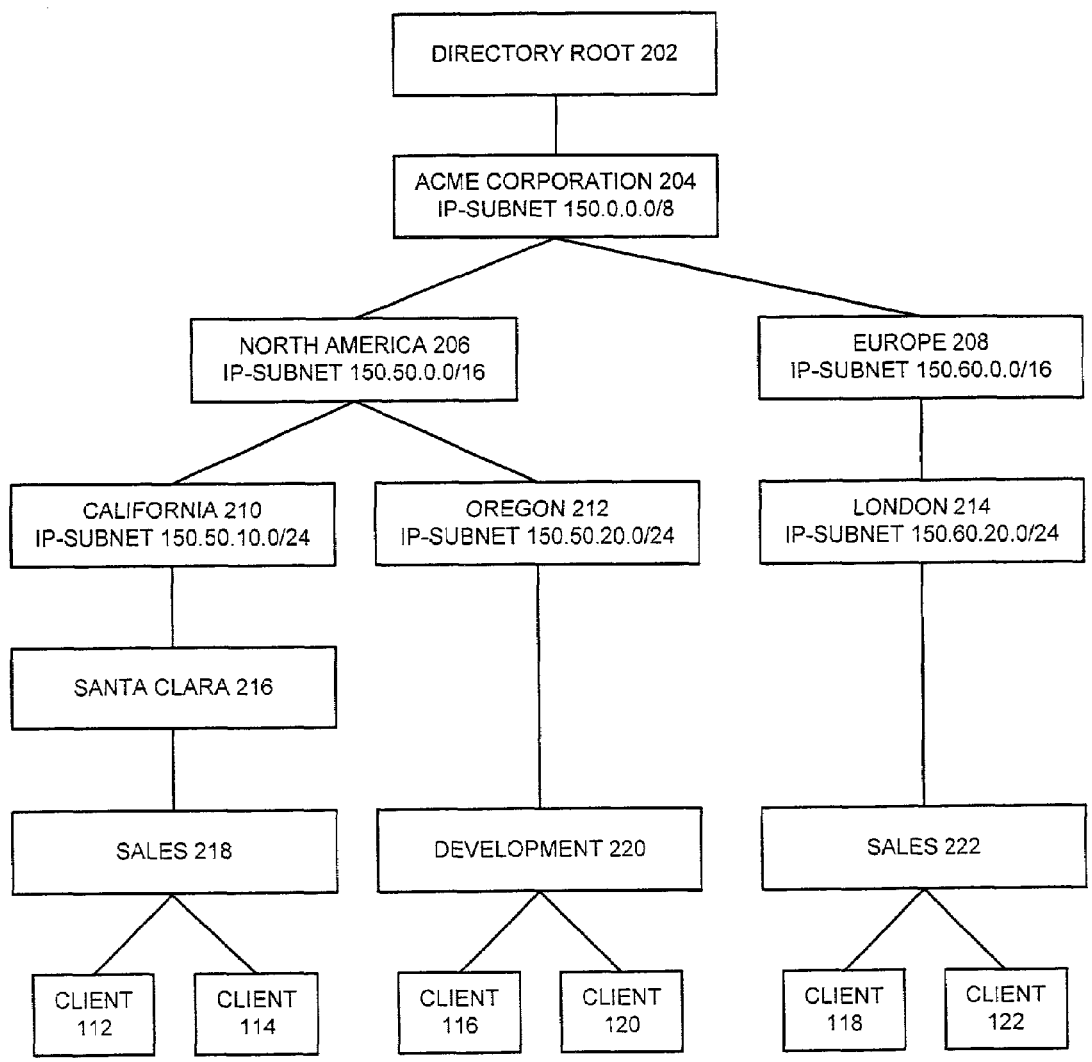
FIG. 2 illustrates a hierarchical directory structure in accordance with an embodiment of the present invention.

FIG. 2 illustrates a hierarchical directory structure in accordance with an embodiment of the present invention. The hierarchical directory structure relates to a fictional corporation named Acme Corporation, which has branches in North America and Europe. Note that a practitioner with ordinary skill in the art will be able to extend this hierarchical directory structure to cover any organization.

Directory root 202 establishes the anchor point for the hierarchical directory structure. Acme Corporation, with network address 150.0.0.0 and an 8-bit subnet mask, is linked to directory root 202. A default set of software management policies is associated with directory root 202.

Both North America 206 and Europe 208 are linked to Acme Corporation 204. North America 206 has network subnet address 150.50.0.0 and a 16-bit subnet mask, while Europe has a network subnet address 150.60.0.0 and a 16-bit subnet mask. Network addresses are assigned and the hierarchical directory structure is sorted such that subnets and computers comprising a logical group are subordinate to the same node within the hierarchical directory structure. For example, in the fictional Acme Corporation, all subnets and computers located in North America have a network address starting with 150.50 and are subordinate to North America 206, while all subnets and computers located in Europe have a network address starting with 150.60 and are subordinate to Europe 208.

Continuing down the hierarchical directory structure, a node can be further divided into other subnodes. In the fictional Acme Corporation, California 210 and Oregon 212 are linked to North America 206 and have network subnet addresses 150.50.10.0 and 150.50.20.0, respectively. Both have 24-bit subnet masks. London 214, with network subnet address 150.60.20.0 and a 24-bit subnet mask is subordinate to Europe 208.

Santa Clara 216, sales 218, and clients 112 and 114 are subordinate to California 210 and have network addresses starting with 150.50.10. Development 220, and clients 116 and 120 are subordinate to Oregon 212 and have network addresses starting with 150.50.20, while sales 222 and clients 118 and 122 are subordinate to London 214 and have network addresses starting with 150.60.20.

Assigning network addresses and sorting the hierarchical directory structure as described above allows policy changes to be applied to one subnet without affecting other subnets. For example, establishing policy changes at Europe 208 will affect only the European subnet and not the North American subnet. An additional advantage to the hierarchical directory structure is that server 106 can easily locate the optimum location for downloading software and software management policies to an individual client.

While the above description implies sorting by geographic locations, there are many other ways that the hierarchical directory structure can be sorted. Some examples include sorting by domain structure, by client operating system, by network bandwidth, or by connection speed. A practitioner with ordinary skill in the art will readily understand that the organization of the hierarchical directory structure can be established in any desired manner.

Server 106

Figure 3:
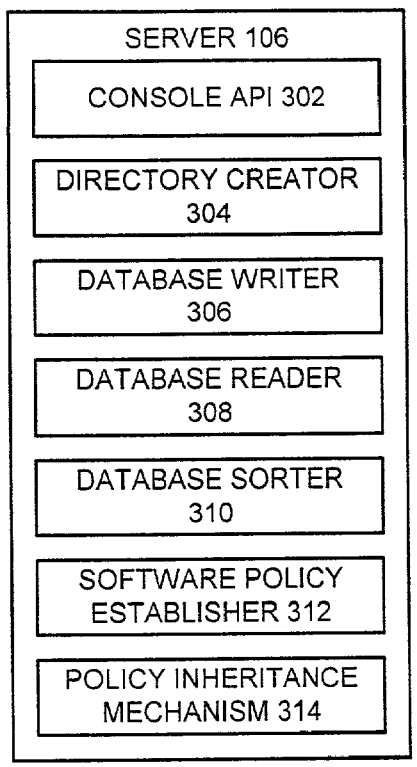
FIG. 3 illustrates server 106 in accordance with an embodiment of the present invention.

FIG. 3 illustrates server 106 in accordance with an embodiment of the present invention. Server 106 includes console application programming interface (API) 302, directory creator 304, database writer 306, database reader 308, database sorter 310, software policy establisher 312, and policy inheritance mechanism 314.

Console API 302 allows administrator 102 to access server 106 from console 104. Console API 302 includes mechanisms to add clients, remove clients, sort the hierarchical directory structure, establish software policies, and specify modifiers for the software policies at each level within the hierarchical directory structure.

Directory creator 304 creates the hierarchical directory structure in accordance with the instructions supplied by administrator 102. Note that administrator 102 can create the hierarchical directory structure in any fashion desired. Typical organizations can include geographic, domain structure, client operating system, network bandwidth, and connection speed.

Server 106 uses database writer 306 to store the hierarchical directory structure in database 108. Server 106 uses database reader 308 to recall the hierarchical directory structure from database 108 when the hierarchical directory structure is needed for updating by administrator 102. Server 106 also uses database reader 308 to recall the hierarchical directory structure when the hierarchical directory structure is needed to establish where a client is located within the hierarchical directory structure so that the correct software management policy can be established for the client.

Database sorter 310 sorts the hierarchical directory structure according to network address and subnet. Sorting the hierarchical directory structure according to network address and subnet allows server 106 to identify where a client is located within the hierarchical directory structure and, in conjunction with policy inheritance mechanism 314, to establish the proper software management policy and modifications for the client.

Database 108

Figure 4:
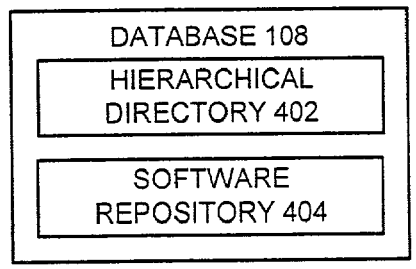
FIG. 4 illustrates database 108 in accordance with an embodiment of the present invention.

FIG. 4 illustrates database 108 in accordance with an embodiment of the present invention. Database 108 includes hierarchical directory structure 402 and software repository 404. Hierarchical directory structure 402 is the hierarchical directory structure described above in conjunction with FIGS. 1 through 3. Software repository 404 includes master copies of software needed by clients within hierarchical directory structure 402. These master copies may include virus protection software for each client type and each operating system within hierarchical directory structure 402.

Client 116

Figure 5:
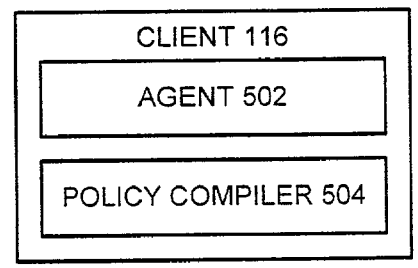
FIG. 5 illustrates client 116 in accordance with an embodiment of the present invention.

FIG. 5 illustrates client 116 in accordance with an embodiment of the present invention. Clients 112, 114, 116, 118, 120, and 122, plus any other clients that may be included within the system, are configured similar to the configuration of client 116, therefore, only client 116 will be described. Client 116 includes agent 502 and policy compiler 504.

Agent 502 operates as a background process within client 116 and communicates with server 106 across network 110 to determine the master policy for the system and to determine any modifications to the master policy for the subnets to which client 116 is assigned. Agent 502 also monitors operations performed by client 116 and enforces the software management policies, which have been established for client 116.

Policy compiler 504 receives the master software management policy and any modifications to the master policy. After receiving the master policy and any modifications, policy compiler 504 compiles the policy for client 116 by modifying the master software management policy with modifications identified for the subnets to which client 116 is assigned.

Compiling a Software Policy

Figure 6:
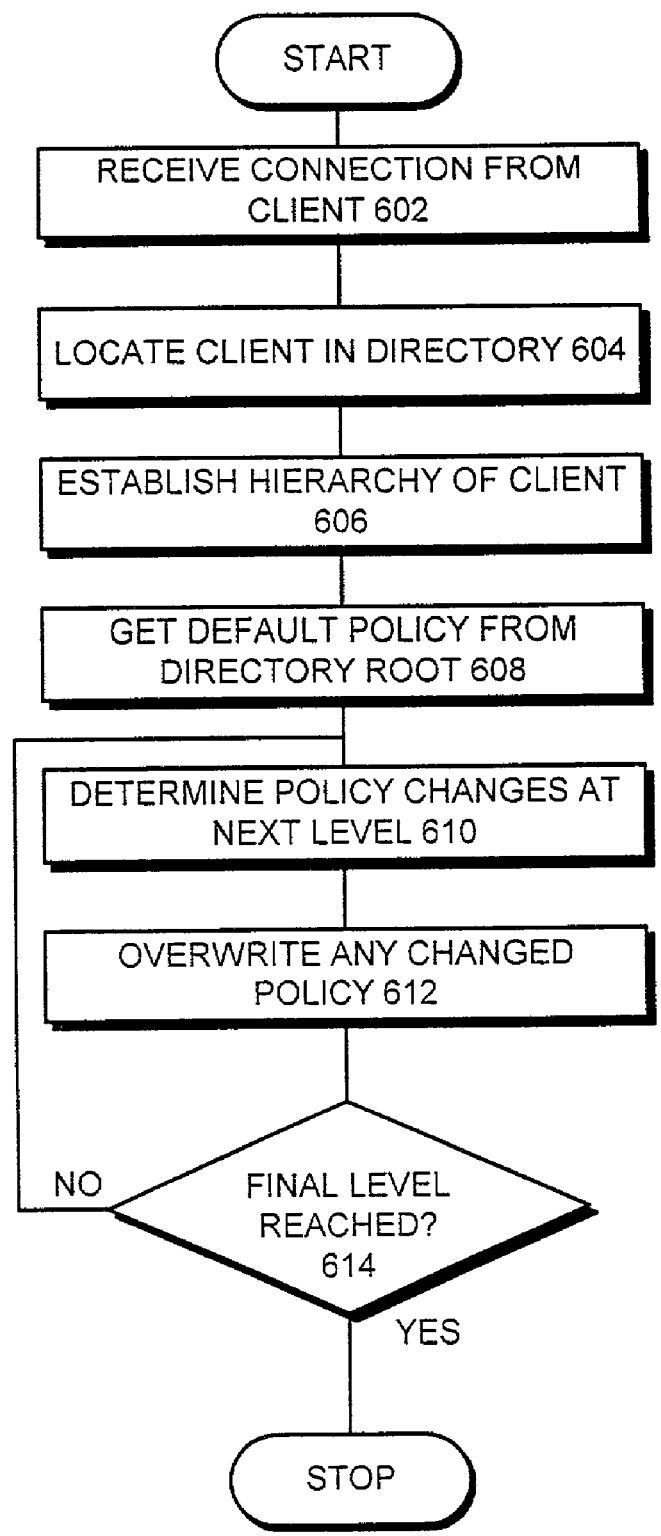
FIG. 6 is a flowchart illustrating the process of compiling a software policy in accordance with an embodiment of the present invention.

FIG. 6 is a flowchart illustrating the process of compiling a software policy in accordance with an embodiment of the present invention. The system starts when server 106 receives a connection from a client, such as client 116 (step 602). Next, server 106 locates client 116 within the hierarchical directory structure (step 604). Server 106 then establishes the hierarchy of client 116 from the hierarchical directory structure (step 606).

Next, client 116 gets the default policy from directory root 202 (step 608). After getting the default policy from directory root 202, client 116 determines any policy changes for a particular subnet at the next level within the hierarchy (step 610). Client 116 then overwrites any changed policy for the particular subnet (step 612). Next, client 116 determines if the final level of the hierarchy has been reached (step 614). If so, the process is ended, otherwise, the process returns to 610 to continue processing levels within the hierarchy.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to facilitate software management by applying network address-sorting rules on a hierarchical directory structure, comprising:

creating the hierarchical directory structure, wherein the hierarchical directory structure reflects a logical coupling among a plurality of computers;

sorting the hierarchical directory structure based on network address of constituent computers of the plurality of computers;

establishing a software policy at root level of the hierarchical directory structure and a modifier for the software policy at a subordinate level of the hierarchical directory structure;

inheriting the software policy at a computer within the hierarchical directory structure, where inheriting comprises inheriting the modifier for the software policy;

compiling the software policy at the computer by applying the modifier for the software policy to the software policy to produce a modified software policy for the computer; and managing virus scan policies associated with the computer where managing comprises managing software on the computer using the modified software policy;

wherein sorting the hierarchical directory structure based on network addresses of constituent computers includes first applying a sub-net mask to the network addresses.

2. The method of claim 1, further comprising storing the hierarchical directory structure in a database coupled to a server.

3. The method of claim 2, wherein the server includes a console application program interface (API) for allowing an administrator to access the server from a console and including mechanisms to add clients, remove clients, sort the hierarchical directory structure, establish software policies, and specify modifiers for the software policies at each level within the hierarchical directory structure, a directory creator that creates the hierarchical directory structure in accordance with instructions supplied by the administrator, a database writer to store the hierarchical directory structure in the database, a database reader to recall the hierarchical directory structure from the database when the hierarchical directory structure is needed for updating by the administrator and is needed to establish where one of the clients is located within the hierarchical directory structure so that a correct software management policy can be established for the client, and a database sorter that sorts the hierarchical directory structure.

4. The method of claim 1, wherein the sorting ensures that subnets and computers comprising a logical group are subordinate to a similar node within the hierarchical directory structure.

5. The method of claim 1, wherein a directory root establishes an anchor point for the hierarchical directory structure.

6. The method of claim 1, wherein the compiling includes receiving a connection from a client, locating the client within the hierarchical directory structure, establishing a hierarchy of the client from the hierarchical directory structure, getting a default policy from a directory root (column 14 lines 9–20), determining any policy changes for a particular subnet at a next level within the hierarchy, overwriting any changed policy for the particular subnet, and determining if a final level of the hierarchy has been reached so that a process continues processing levels within the hierarchy.

7. A computer-readable storage medium storing instructions that when executed by a computer cause the computer to perform a method to facilitate software management by applying network address-sorting rules on a hierarchical directory structure, the method comprising:
creating the hierarchical directory structure, wherein the hierarchical directory structure reflects a logical coupling among a plurality of computers;
sorting the hierarchical directory structure based on network address of constituent computers of the plurality of computers;
establishing a software policy at root level of the hierarchical directory structure and a modifier for the software policy at a subordinate level of the hierarchical directory structure;
inheriting the software policy at a computer within the hierarchical directory structure, where inheriting comprises inheriting the modifier for the software policy;
compiling the software policy at the computer by applying the modifier for the software policy to the software policy to produce a modified software policy for the computer; and
managing virus scan policies associated with the computer where managing comprises managing software on the computer using the modified software policy;
wherein sorting the hierarchical directory structure based on network addresses of constituent computers includes first applying a sub-net mask to the network addresses.

8. The computer-readable storage medium of claim 7, the method further comprising storing the hierarchical directory structure in a database coupled to a server.

9. An apparatus to facilitate software management by applying network address-sorting rules on a hierarchical directory structure, comprising:

a creating mechanism that is configured to create the hierarchical directory structure, wherein the hierarchical directory structure reflects a logical coupling among a plurality of computers;
a sorting mechanism that is configured to sort the hierarchical directory structure based on network addresses of constituent computers of the plurality of computers;
an establishing mechanism that is configured to establish a software policy at a root level of the hierarchical directory structure and a modifier for the software policy at a subordinate level of the hierarchical directory structure;
an inheriting mechanism that is configured to inherit the software policy at a computer within the hierarchical directory structure, where the inheriting includes inheriting the modifier for the software policy;
a compiling mechanism that is configured to compile the software policy at the computer by applying the modifier for the software policy to the software policy to produce a modified software policy for the computer; and
a managing mechanism that is configured to manage software on the computer using the modified software policy, where the managing includes managing virus scan policies associated with the computer;
wherein the sorting mechanism is further configured to apply a sub-net mask to the network addresses prior to sorting the hierarchical directory structure.

10. The apparatus of claim 9, further comprising a storing mechanism that is configured to store the hierarchical directory structure in a database coupled to a server.

* * * * *